(12) United States Patent
Hayashi et al.

(10) Patent No.: US 10,173,397 B2
(45) Date of Patent: Jan. 8, 2019

(54) THERMOPLASTIC RESIN FILM AND LAMINATED GLASS

(71) Applicant: SEKISUI CHEMICAL CO., LTD., Osaka, Osaka (JP)

(72) Inventors: Zenei Hayashi, Osaka (JP); Yoshihiro Inui, Osaka (JP); Takehiro Nakamura, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/127,263

(22) PCT Filed: Mar. 31, 2015

(86) PCT No.: PCT/JP2015/060134
§ 371 (c)(1),
(2) Date: Sep. 19, 2016

(87) PCT Pub. No.: WO2015/152243
PCT Pub. Date: Oct. 8, 2015

(65) Prior Publication Data
US 2017/0106629 A1 Apr. 20, 2017

(30) Foreign Application Priority Data
Mar. 31, 2014 (JP) .................................. 2014-074076

(51) Int. Cl.
*B32B 17/10* (2006.01)
*B32B 27/08* (2006.01)
*B32B 27/30* (2006.01)

(52) U.S. Cl.
CPC .. *B32B 17/10761* (2013.01); *B32B 17/10036* (2013.01); *B32B 17/10743* (2013.01);
(Continued)

(58) Field of Classification Search
None
See application file for complete search history.

(56) References Cited

U.S. PATENT DOCUMENTS 4,945,002 A 7/1990 Tanuma et al.
5,360,659 A 11/1994 Arends et al.
(Continued)

FOREIGN PATENT DOCUMENTS

CN 101410341 A 4/2009
CN 102307824 A 1/2012
(Continued)

OTHER PUBLICATIONS

International Search Report for the Application No. PCT/JP2015/060134 dated Jun. 16, 2015.
(Continued)

*Primary Examiner* — Tahseen Khan
(74) *Attorney, Agent, or Firm* — Cheng Law Group, PLLC (57) ABSTRACT

There is provided a thermoplastic resin film which is high in tear resistance. The thermoplastic resin film according to the present invention is provided with a plurality of first thermoplastic resin layers each containing a thermoplastic resin and a plurality of second thermoplastic resin layers each containing a thermoplastic resin, and has a multilayer structure in which the first and second thermoplastic resin layers are laminated in the thickness direction, the number of laminations in total of the first and second thermoplastic resin layers in the thickness direction is greater than or equal to 5, the ratio of the total thickness of the first thermoplastic resin layers to the total thickness of the second thermoplastic resin layers is greater than 1, the tensile modulus of elasticity of the respective first thermoplastic resin layers is less than or equal to 30 MPa, and the tensile modulus of elasticity of
(Continued)

the respective first thermoplastic resin layers is greater than or equal to 280 MPa.

15 Claims, 3 Drawing Sheets

(52) U.S. Cl.
CPC .............. *B32B 27/08* (2013.01); *B32B 27/30* (2013.01); *B32B 2250/05* (2013.01); *B32B 2250/42* (2013.01); *B32B 2307/418* (2013.01); *B32B 2307/51* (2013.01); *B32B 2307/54* (2013.01); *B32B 2307/5825* (2013.01); *B32B 2605/006* (2013.01)

(56) References Cited

U.S. PATENT DOCUMENTS

| | | | |
|---|---|---|---|
| 5,427,842 | A | 6/1995 | Bland et al. |
| 5,604,019 | A | 2/1997 | Bland et al. |
| 6,040,061 | A | 3/2000 | Bland et al. |
| 2002/0068177 | A1 | 6/2002 | Garnier et al. |
| 2004/0004778 | A1 | 1/2004 | Liu et al. |
| 2010/0233453 | A1 | 9/2010 | Hashimoto |
| 2011/0287229 | A1 | 11/2011 | Sakamoto et al. |
| 2012/0204940 | A1* | 8/2012 | Asanuma .......... B32B 17/10761 136/252 |
| 2014/0227489 | A1* | 8/2014 | Inui ........................ C08L 29/14 428/172 |

FOREIGN PATENT DOCUMENTS

| | | |
|---|---|---|
| JP | 6-190995 A | 7/1994 |
| JP | 6-190997 A | 7/1994 |
| JP | 7-172878 A | 7/1995 |
| JP | 7-172879 A | 7/1995 |
| JP | 10-76620 A | 3/1998 |
| JP | 2001-48600 A | 2/2001 |
| JP | 2007-254207 A | 10/2007 |
| JP | 2012-6406 A | 1/2012 |
| WO | WO2013031884 A1 * | 3/2013 |
| WO | WO-2014/022663 A1 | 2/2014 |

OTHER PUBLICATIONS

International Preliminary Report on Patentability (PCT/IPEA/409) for Application No. PCT/JP2015/060134 dated Mar. 25, 2016.
International Preliminary Report on Patentability (PCT/IPEA/409) for Application No. PCT/JP2015/060134 dated Mar. 25, 2016 (English Translation mailed Oct. 13, 2016).
The First Office Action for the Application No. 201580017519.3 from the State Intellectual Property Office of the People's Republic of China dated Nov. 24, 2017.
Supplementary European Search Report for the Application No. EP 15 77 2544 dated Sep. 22, 2017.
Database WPI Week 199536 Thomson Scientific, London, GB; AN 1995-272727 XP002773766 (and JP 7-172879 A).
Database WPI Week 199822 Thomson Scientific, London, GB; AN 1998-245083 XP002773767 (and JP 10-76620 A).

* cited by examiner

THERMOPLASTIC RESIN FILM AND LAMINATED GLASS

TECHNICAL FIELD

The present invention relates to a thermoplastic resin film in which plural layers each containing a thermoplastic resin are laminated. Moreover, the present invention relates to laminated glass prepared with the thermoplastic resin film which is used as an interlayer film for laminated glass.

BACKGROUND ART

A thermoplastic resin film in which plural layers each containing a thermoplastic resin are laminated has hitherto been known. For example, as disclosed in the following Patent Documents 1 to 3, there is a film (membrane) which has enhanced tear resistance by being made into a multilayer structure. By sticking this film to a pane of window glass, it is possible to prevent the window glass from breaking and to prevent broken pieces of glass from scattering. However, the tear resistance of the above-mentioned film is still insufficient, and there are cases where the required quality for crime prevention performance cannot be satisfied. Moreover, there are cases where a poor appearance caused by the interference fringe and interference color attributed to the multilayer structure occurs.

On the other hand, as a sheet of glass which is hardly broken against breaking through the sheet and is excellent in impact resistance and penetration resistance against physical impact, a sheet of laminated glass has hitherto been known. The laminated glass is produced by sandwiching an interlayer film for laminated glass between a pair of glass plates.

RELATED ART DOCUMENT

Patent Documents

Patent Document 1: JP 06-190995 A
Patent Document 2: JP 06-190997 A
Patent Document 3: JP 10-76620 A

SUMMARY OF THE INVENTION

Problems to be Solved by the Invention

As mentioned above, with regard to a conventional multi-layered thermoplastic resin film, there have been some problems, and in particular, there is a problem that the tear resistance is still insufficient.

Moreover, in a sheet of laminated glass obtained by sandwiching an interlayer film between a pair of glass plates, it is desirable that the interlayer film to be used have high tear resistance.

An object of the present invention is to provide a thermoplastic resin film which is high in tear resistance. Moreover, the present invention is also aimed at providing laminated glass prepared with the thermoplastic resin film which is used as an interlayer film for laminated glass.

Means for Solving the Problems

According to a broad aspect of the present invention, there is provided a thermoplastic resin film including a plurality of first thermoplastic resin layers each containing a thermoplastic resin and a plurality of second thermoplastic resin layers each containing a thermoplastic resin, and having a multilayer structure in which the first thermoplastic resin layers and the second thermoplastic resin layers are laminated in a thickness direction, a number of laminations in total of the first thermoplastic resin layers and the second thermoplastic resin layers in the thickness direction being greater than or equal to 5, a ratio of a total thickness of the first thermoplastic resin layers to a total thickness of the second thermoplastic resin layers being greater than 1, a tensile modulus of elasticity of the respective first thermoplastic resin layers being less than or equal to 30 MPa, and a tensile modulus of elasticity of the respective second thermoplastic resin layers being greater than or equal to 280 MPa.

In a specific aspect of the thermoplastic resin film according to the present invention, a tensile breaking elongation of the respective first thermoplastic resin layers is greater than or equal to 200%, and a tensile breaking elongation of the respective second thermoplastic resin layers is less than or equal to 15%.

In a specific aspect of the thermoplastic resin film according to the present invention, the thermoplastic resin contained in the first thermoplastic resin layer is a polyvinyl acetal resin.

In a specific aspect of the thermoplastic resin film according to the present invention, the thermoplastic resin contained in the second thermoplastic resin layer is a thermoplastic resin different from a polyvinyl acetal resin.

In a specific aspect of the thermoplastic resin film according to the present invention, an absolute value of a difference in refractive index between the first thermoplastic resin layer and the second thermoplastic resin layer is less than 0.03.

In a specific aspect of the thermoplastic resin film according to the present invention, the number of laminations in total of the first thermoplastic resin layers and the second thermoplastic resin layers in the thickness direction is greater than or equal to 10, and in another specific aspect thereof, the number of laminations is greater than or equal to 160.

In a specific aspect of the thermoplastic resin film according to the present invention, a thickness of the respective second thermoplastic resin layers is less than or equal to 11

In a specific aspect of the thermoplastic resin film according to the present invention, the ratio of the total thickness of the first thermoplastic resin layers to the total thickness of the second thermoplastic resin layers is greater than or equal to 1.5.

The thermoplastic resin film according to the present invention is suitably used for obtaining laminated glass, and it is preferred that the thermoplastic resin film be an interlayer film for laminated glass.

According to a broad aspect of the present invention, there is provided laminated glass including a first laminated glass member, a second laminated glass member and an interlayer film for laminated glass which is the thermoplastic resin film described above, the interlayer film for laminated glass being arranged between the first laminated glass member and the second laminated glass member.

Effect of the Invention

The thermoplastic resin film according to the present invention is provided with a plurality of first thermoplastic resin layers each containing a thermoplastic resin and a plurality of second thermoplastic resin layers each containing a thermoplastic resin, and has a multilayer structure in which the first thermoplastic resin layers and the second thermoplastic resin layers are laminated in a thickness direction; the number of laminations in total of the first thermoplastic resin layers and the second thermoplastic resin layers in the thickness direction is greater than or equal to 5; a ratio of a total thickness of the first thermoplastic resin layers to a total thickness of the second thermoplastic resin layers is greater than 1; a tensile modulus of elasticity of the respective first thermoplastic resin layers is less than or equal to 30 MPa, and a tensile modulus of elasticity of the respective second thermoplastic resin layers is greater than or equal to 280 MPa. Accordingly, it is possible to heighten the tear resistance.

MODE(S) FOR CARRYING OUT THE INVENTION

Hereinafter, the details of the present invention will be described.

A thermoplastic resin film according to the present invention is provided with a plurality of first thermoplastic resin layers each containing a thermoplastic resin and a plurality of second thermoplastic resin layers each containing a thermoplastic resin. The thermoplastic resin film according to the present invention has a multilayer structure in which the first thermoplastic resin layers and the second thermoplastic resin layers are laminated in a thickness direction. The number of laminations in total of the first thermoplastic resin layers and the second thermoplastic resin layers in the thickness direction is greater than or equal to 5. A ratio of the total thickness of the first thermoplastic resin layers to the total thickness of the second thermoplastic resin layers is greater than 1. A tensile modulus of elasticity of the respective first thermoplastic resin layers is less than or equal to 30 MPa. It is preferred that a tensile breaking elongation of the respective first thermoplastic resin layers be greater than or equal to 200%. A tensile modulus of elasticity of the respective second thermoplastic resin layers is greater than or equal to 280 MPa. It is preferred that a tensile breaking elongation of the respective second thermoplastic resin layers be less than or equal to 15%.

In the present invention, since the thermoplastic resin film is provided with the above-described configuration, the tear resistance can be heightened. Moreover, in the present invention, the crime prevention performance and the penetration resistance can be heightened. Furthermore, in the present invention, a complicated process is dispensed with, and a thermoplastic resin film suitable as an interlayer film for laminated glass and laminated glass prepared therewith are obtained.

Hereinafter, specific embodiments of the present invention will be described with reference to the drawings.

Figure 1:
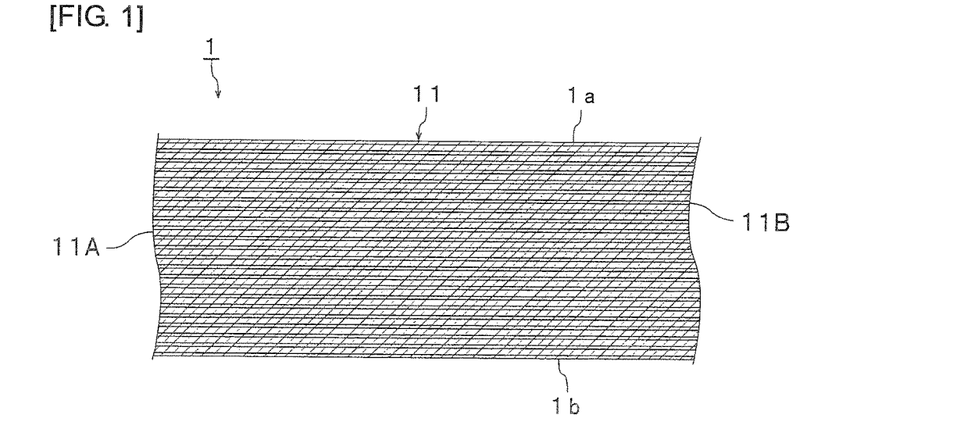
FIG. 1 is a schematic sectional view showing a thermoplastic resin film in accordance with one embodiment of the present invention.

FIG. 1 is a schematic sectional view showing a thermoplastic resin film in accordance with one embodiment of the present invention.

A resin film 1 shown in FIG. 1 is a thermoplastic resin film. The resin film 1 has a plurality of thermoplastic resin layers 11. The resin film 1 has a plurality of first thermoplastic resin layers 11A and a plurality of second thermoplastic resin layers 11B. The first thermoplastic resin layers 11A and the second thermoplastic resin layers 11B are laminated in the thickness direction of the resin film 1. In the present embodiment, the first thermoplastic resin layers 11A and the second thermoplastic resin layers 11B are alternately laminated in the thickness direction of the resin film 1. The resin film 1 has a multilayer structure.

The first thermoplastic resin layer 11A contains a thermoplastic resin. The second thermoplastic resin layer 11B contains a thermoplastic resin. The number of laminations in total of the first thermoplastic resin layers 11A and the second thermoplastic resin layers 11B in the thickness direction is greater than or equal to 5. A tensile modulus of elasticity of the respective first thermoplastic resin layers 11A is less than or equal to 30 MPa. It is preferred that a tensile breaking elongation of the respective first thermoplastic resin layers 11A be greater than or equal to 200%. A tensile modulus of elasticity of the respective second thermoplastic resin layers is greater than or equal to 280 MPa. It is preferred that a tensile breaking elongation of the respective second thermoplastic resin layers 115 be less than or equal to 15%.

At the time when a strain is generated on the thermoplastic resin film according to the present invention due to external force, the second thermoplastic resin layer having a larger tensile modulus of elasticity is broken more preferentially than the first thermoplastic resin layer having a smaller tensile modulus of elasticity in the inside of the thermoplastic resin film. Since the second thermoplastic resin layers are successively broken in the inside of the resin film as the strain becomes large, this enables the energy to be consumed. That is, at the time of being applied with external force, the thermoplastic resin film can absorb a large quantity of energy.

A ratio (T1/T2) of the total thickness (T1) of the first thermoplastic resin layers to the total thickness (T2) of the second thermoplastic resin layers is greater than 1. From the viewpoint of further heightening the tear resistance, it is preferred that the ratio (T1/T2) be greater than or equal to 1.5. The ratio (T1/T2) is more preferably greater than or equal to 4, further preferably greater than or equal to 5, preferably less than or equal to 20, more preferably less than or equal to 10 and further preferably less than or equal to 7. The larger the thickness of the first thermoplastic resin layer becomes, the larger the breaking elongation of the thermoplastic resin film becomes, but it is desirable that the ratio lie within the above-mentioned range because the energy absorption by breakage of the second thermoplastic resin layers at the time when a strain is generated is decreased.

A ratio (L1/L2) of the total number of laminations (L1) of the first thermoplastic resin layers to the total number of laminations (L2) of the second thermoplastic resin layers is preferably greater than or equal to 0.9, more preferably greater than or equal to 1, preferably less than or equal to 1.2 and more preferably less than or equal to 1.1.

The number of layers of the first thermoplastic resin layers is preferably greater than or equal to 3 and more preferably greater than or equal to 5. The number of layers of the second thermoplastic resin layers is preferably greater than or equal to 3 and more preferably greater than or equal to 5.

A tensile modulus of elasticity of the respective first thermoplastic resin layers is less than or equal to 30 MPa and preferably less than or equal to 10 MPa. When the tensile modulus of elasticity of the first thermoplastic resin layer is less than or equal to the above upper limit, the first thermoplastic resin layer becomes difficult to break simultaneously with the breakage of the second thermoplastic resin layer, and as a result, the resin film becomes further difficult to break. The tensile modulus of elasticity of the respective first thermoplastic resin layers is preferably greater than or equal to 0.1 MPa.

A tensile breaking elongation of the respective first thermoplastic resin layers is preferably greater than or equal to 200% and more preferably greater than or equal to 350%. The larger the tensile breaking elongation of the first thermoplastic resin layer is, the more the resin film becomes difficult to break.

A tensile modulus of elasticity of the respective second thermoplastic resin layers is greater than or equal to 280 MPa, preferably greater than or equal to 350 MPa and more preferably greater than or equal to 400 MPa. A tensile breaking elongation of the second thermoplastic resin layer is preferably less than or equal to 15%, more preferably less than or equal to 12% and further preferably less than or equal to 10%. The smaller the tensile breaking elongation of the second thermoplastic resin layer is, the larger quantity of energy the resin film can absorb because a large number of breakages are generated in the inside of the resin film at the time when a strain is generated on the resin film. However, the tensile breaking elongation of the second thermoplastic resin layer is preferably greater than or equal to 1%, more preferably greater than or equal to 3% and further preferably greater than or equal to 5% because the absorbed energy per one breakage is decreased when the tensile breaking elongation thereof is too small.

The tensile modulus of elasticity of the respective first thermoplastic resin layers is measured according to the following procedure. A composition for forming the first thermoplastic resin layer is extruded into a single-layered sheet-like shape using an extruder to obtain a single-layered resin film with an average thickness of 380 μm. A sharp razor blade is used to prepare a test specimen, which is sampled so as to have a strip shape of 10 mm in width by 150 mm in length, of the resulting single-layered resin film. This test specimen is measured for the tensile modulus of elasticity at 23° C. by a method in accordance with ASTM D882: 2012 using a universal testing machine RTC-1310A available from ORIENTEC CORPORATION. The tensile modulus of elasticity of the respective second thermoplastic resin layers is also measured in a similar procedure.

The tensile breaking elongation of the respective first thermoplastic resin layers is measured according to the following procedure. A composition for forming the first thermoplastic resin layer is extruded into a single-layered sheet-like shape using an extruder to obtain a single-layered resin film with an average thickness of 380 μm. A sharp razor blade is used to prepare a test specimen, which is sampled so as to have a strip shape of 10 mm in width by 150 mm in length, of the resulting single-layered resin film. This test specimen is measured for the tensile breaking elongation at 23° C. by a method in accordance with ASTM D882: 2012 using a universal testing machine RTC-1310A available from ORIENTEC CORPORATION. The tensile breaking elongation of the respective second thermoplastic resin layers is also measured in a similar procedure.

In the thermoplastic resin film according to the present invention, the number of laminations in total of the first thermoplastic resin layers and the second thermoplastic resin layers in the thickness direction is greater than or equal to 5, preferably greater than or equal to 10, more greater than or equal to 40 and further greater than or equal to 160. When the number of laminations in total lies within the above preferred range, the tear resistance of the resulting thermoplastic resin film is further enhanced. Moreover, the greater the number of laminations in total is, the more tendencies that the tear resistance is enhanced there are. Although the upper limit of the number of laminations in total is not particularly limited, for example, from practical aspects, the upper limit thereof is less than or equal to 100000 layers.

It is preferred that the thermoplastic resin film have a portion composed of the first thermoplastic resin layer, the second thermoplastic resin layer, the first thermoplastic resin layer and the second thermoplastic resin layer which are laminated in this order, and it is more preferred that the thermoplastic resin film have a plurality of the portions.

Each of first thermoplastic resin layers (A) and each of second thermoplastic resin layers (B) may be alternately laminated so as to have a stack of A/B/A/B . . . , and two first thermoplastic resin layers or two second thermoplastic resin layers may be laminated in a superposing manner so as to have a stack of A/B/A/A/B/A . . . or a stack of A/B/B/A/B/B . . . . Moreover, these thermoplastic resin layers and another resin layer other than the first thermoplastic resin layer and the second thermoplastic resin layer may be laminated together. In view of the simplicity of lamination at the time of being made into a sheet of laminated glass, it is preferred that a surface layer at one side of the thermoplastic resin layer, be the first thermoplastic resin layer mentioned above, and it is preferred that a surface layer at the other side thereof be the first thermoplastic resin mentioned above. It is preferred that one or two layer(s) among the first thermoplastic resin layers be positioned at the outermost surface(s) of the thermoplastic resin film.

The thickness of one layer of each of the second thermoplastic resin layers is preferably less than or equal to 20 μm, more preferably less than or equal to 11 μm, even more preferably less than or equal to 3 μm, further preferably less than or equal to 1.5 μm and especially preferably less than or equal to 1 μm. When the thickness of one layer of each of the second thermoplastic resin layers is less than or equal to the above upper limit, the first thermoplastic resin layer becomes further difficult to break at the time of the breakage of the second thermoplastic resin layer, and the resin film becomes further difficult to break. The thickness of one layer of each of the second thermoplastic resin layers is preferably greater than or equal to 0.01 μm.

From the viewpoint of enhancing the transparency, it is desirable that an absolute value of a difference in refractive index between the first thermoplastic resin layer and the second thermoplastic resin layer be made small, and the absolute value of the difference in refractive index is preferably less than 0.03, more preferably less than 0.02 and further preferably less than 0.01. When the absolute value of the difference in refractive index is less than or equal to the above upper limit, reflection, refraction and scattering of light and the like become difficult to occur at the interface between layers in the resin film, and the transparency is further enhanced.

The thermoplastic resin film may be drawn. A drawing temperature is preferably higher than or equal to 50° C., more preferably higher than or equal to 60° C., further preferably higher than or equal to 64° C., preferably lower than 90° C., more preferably lower than 70° C. and further preferably lower than 66° C. When the drawing temperature is higher than or equal to the above lower limit, shrinkage due to elasticity of the resin becomes difficult to occur and the molecular orientation is effectively developed. When the drawing temperature is lower than or equal to the above upper limit or is lower than the above upper limit, the resin becomes difficult to flow and to be deformed and the molecular orientation is effectively developed. A draw ratio is preferably greater than or equal to 1.5 times, more preferably greater than or equal to 2 times and further preferably greater than or equal to 3 times.

In the case where the above-mentioned thermoplastic resin film is an interlayer film for laminated glass, by heightening the tear strength of the interlayer film, the penetration resistance of laminated glass provided with the interlayer film is increased. Accordingly, this enables a glass plate with a thickness thinner than that of a conventional glass plate to be used for obtaining a sheet of laminated glass while maintaining penetration resistance performance equivalent to conventional performance, and the sheet of laminated glass can be reduced in weight.

The thermoplastic resin film according to the present invention may have another thermoplastic resin film layered on the surface thereof to be used as a composite film.

The surface of the above-mentioned thermoplastic resin film may be embossed. Examples of an embossing method include an embossing roll method, a lip emboss method, and the like. Of these, since it is possible to perform emboss processing such that a constant uneven pattern is quantitatively formed, the embossing roll method is preferred.

From the viewpoints of further enhancing the adhesiveness to a laminated glass member and further enhancing the penetration resistance of laminated glass, the outer surface of the embossed resin film preferably has a ten-point average roughness Rz of greater than or equal to 0.1 µm, more preferably greater than or equal to 1 µm, preferably less than or equal to 100 µm and more preferably less than or equal to 50 µm. The ten-point average roughness Rz is measured in accordance with JIS B0601:1994.

Hereinafter, the details of each ingredient included in the resin film according to the present invention will be described.

(Thermoplastic Resin Contained in Thermoplastic Resin Layer)

Examples of the thermoplastic resin include a polyvinyl acetal resin, an ethylene-vinyl acetate copolymer, polystyrene, an acrylic resin, a phenol resin, a vinyl chloride resin, an AS resin, polycarbonate, polyester, an ABS resin, an acetal resin, a polyamide resin, cellulose acetate, an MS resin, an MBS resin, an SB resin, and the like. Thermoplastic resins other than these may be used.

It is preferred that the thermoplastic resin contained in the first thermoplastic resin layer be a polyvinyl acetal resin.

The thermoplastic resin contained in the second thermoplastic resin layer is appropriately selected in view of the tensile breaking elongation. It is preferred that the thermoplastic resin contained in the second thermoplastic resin layer be a thermoplastic resin different from a polyvinyl acetal resin. Examples of the thermoplastic resin contained in the second thermoplastic resin layer include polystyrene, an acrylic resin, a phenol resin, a vinyl chloride resin, an AS resin, polycarbonate, polyester, an ABS resin, an acetal resin, a polyamide resin, cellulose acetate, an MS resin, an MBS resin, an SB resin, an ionomer resin, and the like. Of these, since the tear resistance of the resulting thermoplastic resin film is further enhanced, it is preferred that the thermoplastic resin contained in the second thermoplastic resin layer be an acrylic resin or an ionomer resin. Thermoplastic resins other than these may be used. Examples of the ionomer resin include an ethylene-methacrylic acid copolymer resin, and the like.

From the viewpoint of improving tensile strength, adhesive force, penetration resistance and sound insulating properties with good balance, it is preferred that the thermoplastic resin be a polyvinyl acetal resin or an ethylene-vinyl acetate copolymer, and it is more preferred that the thermoplastic resin be a polyvinyl acetal resin.

From the viewpoint of further improving the tensile strength, the adhesive force, the penetration resistance and the sound insulating properties with good balance, it is preferred that the respective layers constituting the resin film contain a polyvinyl acetal resin as the thermoplastic resin, and it is more preferred that the respective layers contain a polyvinyl acetal resin and a plasticizer. It is preferred that the first thermoplastic resin layer contain a polyvinyl acetal resin.

For example, the polyvinyl acetal resin can be produced by acetalizing polyvinyl alcohol (PVA) with an aldehyde. The saponification degree of PVA generally lies within the range of 70 to 99.9% by mole.

The polymerization degree of PVA for obtaining the polyvinyl acetal resin is preferably greater than or equal to 200, more preferably greater than or equal to 500, further preferably greater than 1700, especially preferably greater than or equal to 2000, preferably less than or equal to 5000, more preferably less than or equal to 4000, even more preferably less than or equal to 3000, further preferably less than 3000 and especially preferably less than or equal to 2800. It is preferred that the polyvinyl acetal resin be a polyvinyl acetal resin obtained by acetalizing PVA with a polymerization degree greater than or equal to the above lower limit and less than or equal to the above upper limit. When the polymerization degree is greater than or equal to the above lower limit, the penetration resistance of laminated glass is further enhanced. When the polymerization degree is less than or equal to the above upper limit, formation of a resin film is facilitated.

The polymerization degree of PVA refers to an average polymerization degree of PVA. The average polymerization degree of PVA is determined by a method in accordance with JIS K6726 "Testing methods for polyvinyl alcohol".

In general, as the aldehyde, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexyl aldehyde, n-octyl aldehyde, n-nonyl aldehyde, n-decyl aldehyde, benzaldehyde, and the like. Of these, preferred is n-butyraldehyde, n-hexyl aldehyde or n-valeraldehyde, and more preferred is n-butyraldehyde. One kind of the aldehyde may be used alone, and two or more kinds thereof may be used in combination.

It is preferred that the polyvinyl acetal resin included in the resin film be a polyvinyl butyral resin. By the use of the polyvinyl butyral resin, the adhesive force of the resin film to a laminated glass member is further moderately developed. Furthermore, the weather resistance and the like of the resin film are further enhanced.

(Plasticizer)

It is preferred that the layer containing the thermoplastic resin contain a plasticizer. In particular, it is preferred that the thermoplastic resin layer containing the polyvinyl acetal resin contain a plasticizer. One kind of the plasticizer may be used alone, and two or more kinds thereof may be used in combination.

Examples of the plasticizer include organic acid ester plasticizers such as a monobasic organic acid ester and a polybasic organic acid ester, organic phosphoric acid ester plasticizers such as an organic phosphoric acid ester plasticizer and an organic phosphorous acid ester plasticizer, and the like. Of these, organic acid ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, hepthylic acid, n-octylic acid, 2-ethylhexanoic acid, n-nonylic acid, decylic acid, and the like.

Examples of the polybasic organic acid ester include an ester compound of a polybasic organic acid and an alcohol having a linear or branched structure of 4 to 8 carbon atoms, and the like. Examples of the polybasic organic acid include adipic acid, sebacic acid, azelaic acid, and the like. The monobasic organic acid ester is not particularly limited and examples thereof include a glycol ester obtained by the reaction of a glycol with a monobasic organic acid, an ester of triethylene glycol or tripropylene glycol and a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, hepthylic acid, n-octylic acid, 2-ethylhexylic acid, n-nonylic acid, decylic acid, and the like.

Examples of the polybasic organic acid ester include an ester compound of a polybasic organic acid and an alcohol having a linear or branched structure of 4 to 8 carbon atoms, and the like. Examples of the polybasic organic acid include adipic acid, sebacic acid, azelaic acid and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic acid alkyd, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate and the like.

It is preferred that the plasticizer be a diester plasticizer represented by the following formula (1).

[Chemical 1]

Formula (1)

In the foregoing formula (1), R1 and R2 each represent an organic group with 2 to 10 carbon atoms, R3 represents an ethylene group, an isopropylene group or a n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

In the foregoing formula (1), R1 and R2 each represent an organic group with 5 to 10 carbon atoms, R3 represents an ethylene group, an isopropylene group or a n-propylene group, and p represents an integer of 3 to 10. It is preferred that R1 and R2 in the foregoing formula (1) each be an organic group with 6 to 10 carbon atoms.

It is preferred that the plasticizer be triethylene glycol di-2-ethylhexanoate (3GO), triethylene glycol di-2-ethylbutyrate (3GH) or triethylene glycol di-2-ethylpropanoate, it is more preferred that the plasticizer be triethylene glycol di-2-ethylhexanoate or triethylene glycol di-2-ethylbutyrate, and it is further preferred that the plasticizer be triethylene glycol di-2-ethylhexanoate.

In the layer containing the polyvinyl acetal resin and the plasticizer, the addition amount of the plasticizer relative to the polyvinyl acetal resin can be appropriately adjusted depending on the average polymerization degree of PVA, the acetalization degree of the polyvinyl acetal resin, the acetylation degree of the polyvinyl acetal resin, and the like, and the addition amount is not particularly limited. The content of the plasticizer is preferably greater than or equal to 25 parts by weight, more preferably greater than or equal to 30 parts by weight, further preferably greater than or equal to 35 parts by weight, preferably less than or equal to 50 parts by weight, more preferably less than or equal to 45 parts by weight, further preferably less than or equal to 43 parts by weight and especially preferably less than or equal to 38 parts by weight, relative to 100 parts by weight of the polyvinyl acetal resin. When the content of the plasticizer is greater than or equal to the above lower limit, the penetration resistance of laminated glass is further enhanced. When the content of the plasticizer is less than or equal to the above upper limit, the transparency of the resin film is further enhanced.

(Other Ingredients)

Respective layers in the above-mentioned resin film may contain additives such as an ultraviolet ray absorber, an oxidation inhibitor, a light stabilizer, a flame retardant, an antistatic agent, a pigment, a dye, an adhesive force regulating agent, a moisture-resistance improving agent, a fluorescent brightening agent and an infrared ray absorber, as necessary.

(Production Method of Thermoplastic Resin Film)

Examples of a production method of the above-mentioned thermoplastic resin film include a wet lamination method, a dry lamination method, an extrusion coating method, a multi-layer melt extrusion molding method, a hot melt lamination method, a heat lamination method, and the like.

It is preferred that the above-mentioned resin film be obtained by a multi-layer melt extrusion molding method, since the production is easy and a thermoplastic resin film excellent in tensile strength is obtained. Examples of the multi-layer melt extrusion molding method include a multi-manifold method, a feed block method, and the like.

(Laminated Glass)

The thermoplastic resin film according to the present invention is suitably used for obtaining laminated glass. It is preferred that the thermoplastic resin film according to the present invention be an interlayer film for laminated glass.

The laminated glass according to the present invention is provided with a first laminated glass member, a second laminated glass member and an interlayer film for laminated glass which is the thermoplastic resin film mentioned above. The interlayer film for laminated glass is arranged between the first laminated glass member and the second laminated glass member.

Figure 2:
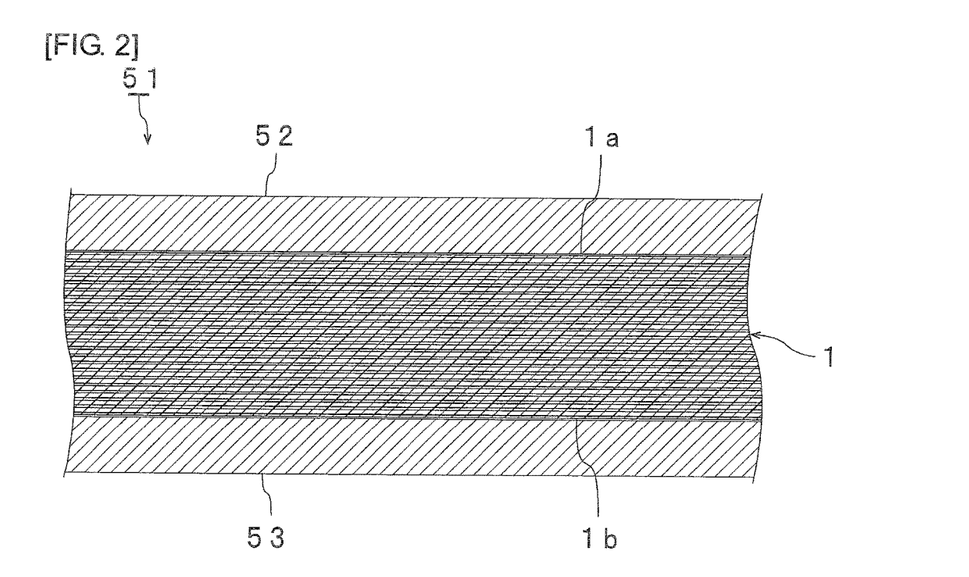
FIG. 2 is a schematic sectional view showing laminated glass provided with the thermoplastic resin film shown in FIG. 1.

FIG. 2 is a schematic sectional view showing laminated glass provided with the thermoplastic resin film shown in FIG. 1.

Laminated glass 51 shown in FIG. 2 is provided with a first laminated glass member 52, a second laminated glass member 53 and a resin film 1. The resin film 1 is arranged between the first laminated glass member 52 and the second laminated glass member 53 to be sandwiched therebetween. The first laminated glass member 52 is layered on a first surface 1a of the resin film 1. The second laminated glass member 53 is layered on a second surface 1b of the resin film 1. Accordingly, the first laminated glass member 52, the resin film 1 and the second laminated glass member 53 are layered in this order, and the laminated glass 51 is thus constituted.

Examples of the laminated glass member include a glass plate, a polycarbonate film, a cycloolefin film, an acrylic film, a polyester film, and the like. As the laminated glass, laminated glass in which a resin film is sandwiched between a glass plate and a PET film or the like, as well as laminated glass in which a resin film is sandwiched between two glass plates, is included. Laminated glass is a laminate provided with a glass plate, and it is preferred that at least one glass plate be used. It is preferred that the first laminated glass member and the second laminated glass member be each a glass plate or a PET film, and it is preferred that the laminated glass be provided with a glass plate as at least one among the first laminated glass member and the second laminated glass member.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, net-reinforced plate glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

The thickness of the laminated glass member is preferably greater than or equal to 0.5 mm, more preferably greater than or equal to 1 mm, preferably less than or equal to 5 mm and more preferably less than or equal to 3 mm. Moreover, in the case where the laminated glass member is a glass plate, the thickness of the glass plate is preferably greater than or equal to 1 mm and preferably less than or equal to 3 mm. In the case where the laminated glass member is a PET film, the thickness of the PET film is preferably greater than or equal to 0.03 mm and preferably less than or equal to 0.5 mm.

The production method of the laminated glass is not particularly limited. For example, a resin film is sandwiched between the first laminated glass member and the second laminated glass member, and the air remaining between the first laminated glass member and the resin film and between the first laminated glass member and the resin film is removed by allowing the members to pass through a pressing roll or by putting the members into a rubber bag and allowing the contents to be sucked under reduced pressure. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained. In the case where an outer surface opposite to the laminate side of the second layer is embossed, the air remaining between the first laminated glass member and the interlayer film and between the second laminated glass member and the interlayer film can be further effectively removed.

The laminated glass can be used for automobiles, railway vehicles, aircraft, ships, buildings and the like. The laminated glass can also be used for applications other than these applications. It is preferred that the laminated glass be laminated glass for building or for vehicles, and it is more preferred that the laminated glass be laminated glass for vehicles. The laminated glass can be used for a windshield, side glass, rear glass or roof glass of an automobile and the like. Moreover, by being layered together with another inorganic film or organic film to be used, for example, the laminated glass can also be used as functional laminated glass such as sound-insulating laminated glass imparted with sound insulating properties.

A haze value of the laminated glass is preferably lower than or equal to 3%, more preferably lower than or equal to 2%, even more preferably lower than or equal to 1%, further preferably lower than or equal to 0.5% and especially preferably lower than or equal to 0.4%. The haze value of laminated glass can be measured in accordance with JIS K6714. In order to make the haze of the laminated glass low, it is preferred that the respective layers constituting the above-mentioned resin film do not contain filler.

In this connection, by being layered together with a rigid body other than glass, for example, by being layered together with a metal, an inorganic material or the like, the thermoplastic resin film according to the present invention can also be used as a vibration control material.

Hereinafter, the present invention will be described in more detail with reference to examples. The present invention is not limited only to these examples.

Example 1

As a resin for forming a first thermoplastic resin layer, a polyvinyl butyral resin (the average polymerization degree of 1700, the acetalization degree of mol %, the acetylation degree of 1 mol %, the content ratio of the hydroxyl group of 30 mol %, available from SEKISUI CHEMICAL CO., LTD.) was prepared. As a plasticizer, triethylene glycol di-2-ethylhexanoate (3GO) was prepared. As a resin for forming a second thermoplastic resin layer, an acrylic resin (MF001, the Vicat softening temperature of 89° C. (JIS K7206), the melt flow rate of 14.0 g/10 min (JIS K7210, 230° C., 37.3 N), available from MITSUBISHI RAYON CO., LTD.) was prepared. The acrylic resin was dried for 6 hours at a temperature of 75° C. and then used.

To an extruder 1 heated to 170° C., 100 parts by weight of the resin for forming a first thermoplastic resin layer and 40 parts by weight of a plasticizer were supplied as a composition for forming a first thermoplastic resin layer. To an extruder 2 heated to 200° C., the resin for forming a second thermoplastic resin layer was supplied. At this time, the extrusion amount per hour was set so that the weight ratio of an extrusion amount of the extruder 1 to an extrusion amount of the extruder 2 became 6:1. A molten resin extruded from the extruder 1 through a gear pump and a molten resin extruded from the extruder 2 through a gear pump were alternately laminated and merged into a feed block with which 41 layers are laminated to be combined so that a 41-layered laminate 21 was obtained (see FIG. 3). Afterward, the laminate 21 was supplied to a square mixer to obtain an 82-layered laminate 22 (see FIGS. 4 to 6). Afterward, the laminate 22 was supplied to a second square mixer to obtain a 164-layered laminate.

Figure 3:
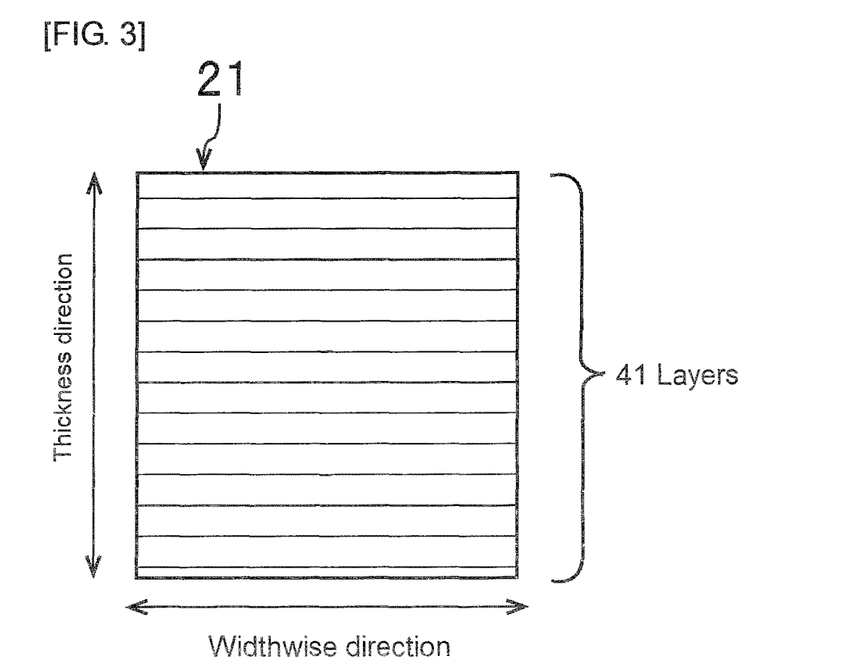
FIG. 3 is a schematic view for illustrating the production process of a thermoplastic resin film.
Figure 4:
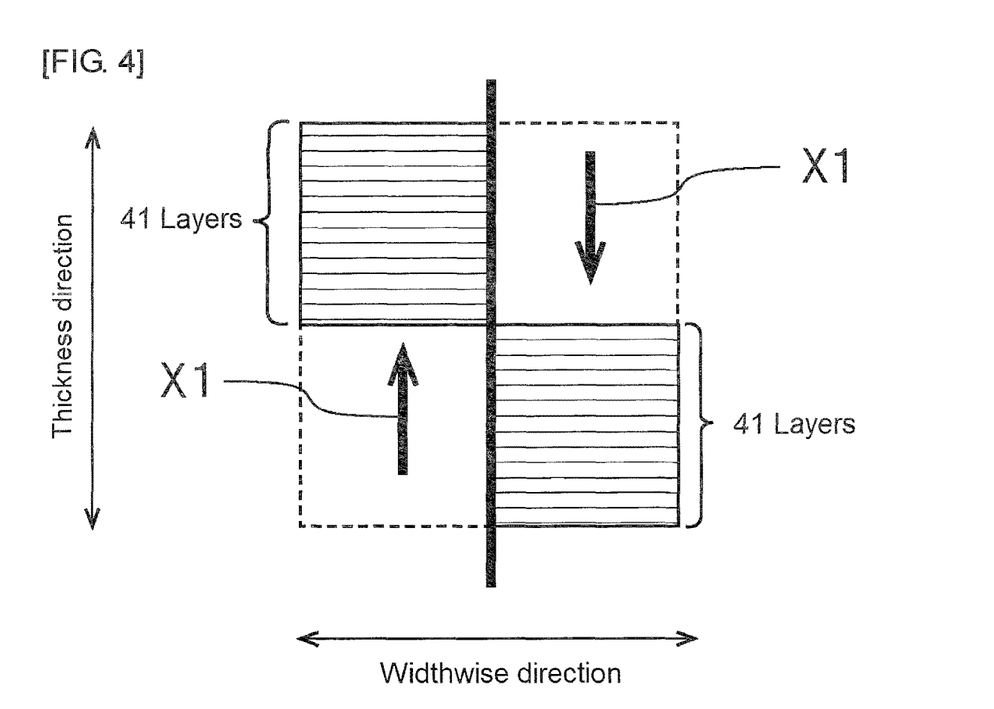
FIG. 4 is a schematic view for illustrating the production process of the thermoplastic resin film.
Figure 5:
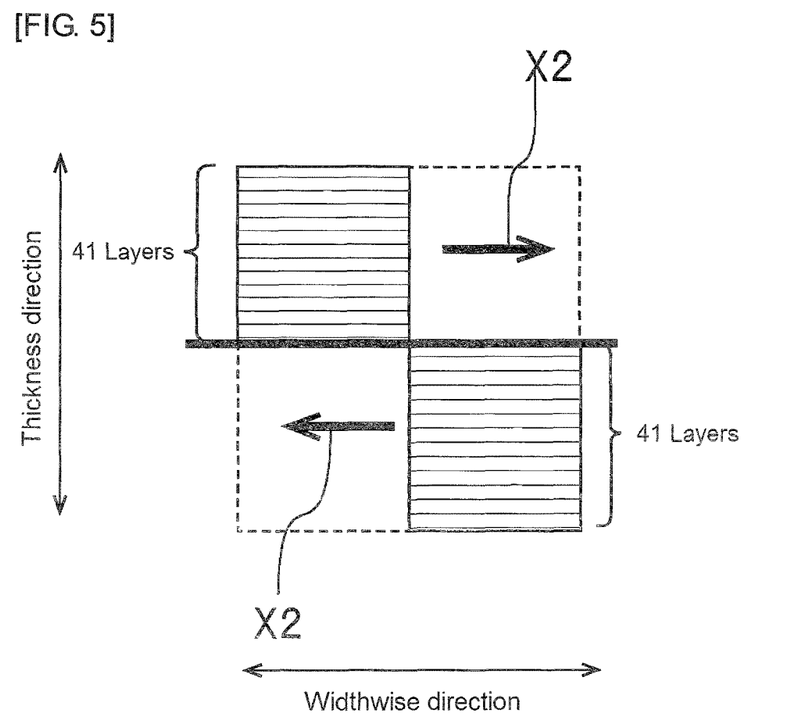
FIG. 5 is a schematic view for illustrating the production process of the thermoplastic resin film.
Figure 6:
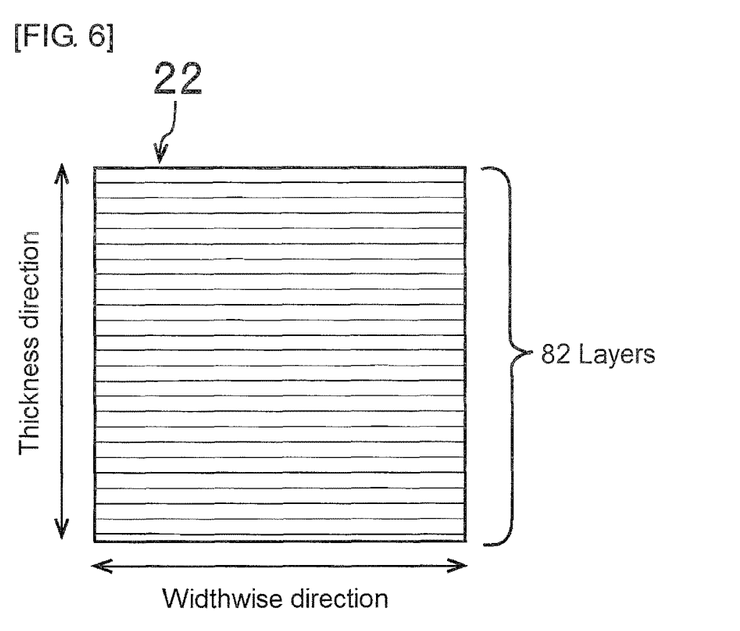
FIG. 6 is a schematic view for illustrating the production process of the thermoplastic resin film.

In this connection, the square mixer is a cylindrical body having a flow passage in which a thermoplastic resin is passed through a passage with a rectangular sectional shape, the thermoplastic resin is divided into two portions by branched passages, and these portions can be stacked and merged to make the number of layers to be doubled. In the square mixer, the 41-layered laminate 21 shown in FIG. 3 is divided into two portions along a dividing line at the center thereof as shown in FIG. 4, the passages are compressed in the direction of the arrow X1, respectively, and two compressed objects, in which the number of layers is 41 and the thickness is one-half of the thickness of the laminate 21, can be obtained. Next, as shown in FIG. 5, the passages are enlarged in the direction of the arrow X2, respectively, and as shown in FIG. 6, a laminate 22 having a number of layers of 84, which is two times the number of layers of the laminate 21, can be obtained. The same operation can be repeated to obtain a 164-layered laminate.

The 164-layered laminate thus obtained was supplied to a T-die and formed into a sheet-like shape, after which the sheet was withdrawn with a take-up roll to obtain a 164-layered resin film with an average thickness of 380 μm. In this context, at the time of being used for the evaluation, a portion of a thickness of 380 μm was chosen to perform sampling.

Example 2

A 164-layered resin film was obtained in the same manner as that in Example 1 except that the weight ratio of an extrusion amount of the extruder 1 to an extrusion amount of the extruder 2 was set to 2:1.

Example 3

A 164-layered resin film was obtained in the same manner as that in Example 1 except that the weight ratio of an extrusion amount of the extruder 1 to an extrusion amount of the extruder 2 was set to 4:1.

Example 4

A 164-layered resin film was obtained in the same manner as that in Example 1 except that the weight ratio of an extrusion amount of the extruder 1 to an extrusion amount of the extruder 2 was set to 9:1.

Example 5

A 41-layered resin film was obtained in the same manner as that in Example 1 except that the square mixers were not used.

Example 6

An 82-layered resin film was obtained in the same manner as that in Example 1 except that the number of square mixers used was set to 1.

Example 7

A 656-layered resin film was obtained in the same manner as that in Example 1 except that the number of square mixers used was set to 4.

Example 8

A 1312-layered resin film was obtained in the same manner as that in Example 1 except that the number of square mixers used was set to 5.

Example 9

A 5248-layered resin film was obtained in the same manner as that in Example 1 except that the number of square mixers used was set to 7.

Example 10

An 11-layered resin film was obtained in the same manner as that in Example 1 except that the feed block used was changed to a feed block with which 11 layers are laminated to be combined, and the square mixers were not used.

Example 11

An 11-layered resin film was obtained in the same manner as that in Example 1 except that the feed block used was changed to a feed block with which 11 layers are laminated to be combined, the weight ratio of an extrusion amount of the extruder 1 to an extrusion amount of the extruder 2 was set to 4:1, and the square mixers were not used.

Example 12

A 640-layered resin film was obtained in the same manner as that in Example 1 except that the content of the plasticizer in the composition for forming a first thermoplastic resin layer was changed to 35 parts by weight, the feed block used was changed to a feed block with which 40 layers are laminated to be combined, and the number of square mixers used was set to 4.

Example 13

A 640-layered resin film was obtained in the same manner as that in Example 1 except that the content of the plasticizer in the composition for forming a first thermoplastic resin layer was changed to 30 parts by weight, the feed block used was changed to a feed block with which 40 layers are laminated to be combined, and the number of square mixers used was set to 4.

Example 14

A 160-layered resin film was obtained in the same manner as that in Example 1 except that the content of the plasticizer in the composition for forming a first thermoplastic resin layer was changed to 35 parts by weight, the acrylic resin (MF001) as the resin for forming a second thermoplastic resin layer was changed to an ethylene-methacrylic acid copolymer resin (Hi-Milan 1706, available from DUPONT-MITSUI POLYCHEMICALS CO., LTD.), the heating temperature of the extruder 2 at the time of supplying the resin for forming a second thermoplastic resin layer to the extruder 2 was changed to 190° C., the feed block used was changed to a feed block with which 40 layers are laminated to be combined, and the number of square mixers used was set to 2.

Comparative Example 1

As a resin for forming a first thermoplastic resin layer, polyvinyl butyral (BH-8, available from SEKISUI CHEMICAL CO., LTD.) was prepared. As a plasticizer, triethylene glycol di-2-ethylhexanoate (3GO, available from SEKISUI CHEMICAL CO., LTD.) was prepared. To an extruder heated to 170° C., 100 parts by weight of the resin and 40 parts by weight of the plasticizer were supplied, the mixture was supplied through a gear pump to a T-die and formed into a sheet-like shape, after which the sheet was withdrawn with a take-up roll to obtain a single-layered resin film with an average thickness of 380 μm. In this context, at the time of being used for the evaluation, a portion of a thickness of 380 μm was chosen to perform sampling.

Comparative Example 2

As a resin for forming a second thermoplastic resin layer, an acrylic resin (MF001, available from MITSUBISHI RAYON CO., LTD.) was prepared. This acrylic resin was dried for 6 hours at a temperature of 75° C. and then used. The resin was supplied to an extruder heated to 200° C., supplied through a gear pump to a T-die and formed into a sheet-like shape, after which the sheet was withdrawn with a take-up roll to obtain a single-layered resin film with an average thickness of 380 μm.

Comparative Example 3

A 3-layered resin film was obtained in the same manner as that in Example 1 except that the feed block used was changed to a feed block with which 3 layers are laminated to be combined, the weight ratio of an extrusion amount of the extruder 1 to an extrusion amount of the extruder 2 was set to 2:1, and the square mixers were not used.

Comparative Example 4

A 3-layered resin film was obtained in the same manner as that in Example 1 except that the feed block used was changed to a feed block with which 3 layers are laminated to be combined, the weight ratio of an extrusion amount of the extruder 1 to an extrusion amount of the extruder 2 was set to 4:1, and the square mixers were not used.

Comparative Example 5

A 3-layered resin film was obtained in the same manner as that in Example 1 except that the feed block used was changed to a feed block with which 3 layers are laminated to be combined, the weight ratio of an extrusion amount of the extruder 1 to an extrusion amount of the extruder 2 was set to 6:1, and the square mixers were not used.

Comparative Example 6

An 11-layered resin film was obtained in the same manner as that in Example 1 except that the feed block used was changed to a feed block with which 11 layers are laminated to be combined, the composition for forming a first thermoplastic resin layer was supplied to the extruder 2 in place of the resin for forming a second thermoplastic resin layer, the weight ratio of an extrusion amount of the extruder 1 to an extrusion amount of the extruder 2 was set to 1:1, and the square mixers were not used.

Comparative Example 7

An 11-layered resin film was obtained in the same manner as that in Example 1 except that the feed block used was changed to a feed block with which 11 layers are laminated to be combined, the resin for forming a second thermoplastic resin layer was supplied to the extruder 1 in place of the composition for forming a first thermoplastic resin layer, the weight ratio of an extrusion amount of the extruder 1 to an extrusion amount of the extruder 2 was set to 1:1, and the square mixers were not used.

Comparative Example 8

An 11-layered resin film was obtained in the same manner as that in Example 1 except that the feed block used was changed to a feed block with which 11 layers are laminated to be combined, the weight ratio of an extrusion amount of the extruder 1 to an extrusion amount of the extruder 2 was set to 1:1, and the square mixers were not used.

Comparative Example 9

A 164-layered resin film was obtained in the same manner as that in Example 1 except that the weight ratio of an extrusion amount of the extruder 1 to an extrusion amount of the extruder 2 was set to 1:1,
(Evaluation)
(1) Thickness
The thickness of the thermoplastic resin film (the whole thickness of the first thermoplastic resin layer and the second thermoplastic resin layer) was measured by a method in accordance with JIS K7127:1999 using a micrometer MCD130-25 available from Niigata seiki Co., Ltd.
(2) Ratio Between Layers
A resin film was cut at the center portion with a sharp razor blade, and at the center part in the widthwise direction of the exposed section, the thickness of the respective layers was measured using a digital microscope VHX-2000 available from KEYENCE CORPORATION. The ratio (T1/T2) of a total thickness (T1) of all of first thermoplastic resin layers to a total thickness (T2) of all of second thermoplastic resin layers was determined.
(3) Tensile Modulus of Elasticity
A sharp razor blade was used to prepare a test specimen which was sampled so as to have a strip shape of 10 mm in width by 150 mm in length. This test specimen was measured for the tensile modulus of elasticity at 23° C. by a method in accordance with ASTM D882: 2012 using a universal testing machine RTC-1310A available from ORIENTEC CORPORATION. The tensile modulus of elasticity of the single-layered resin film of Comparative Example 1 (corresponding to the first resin layer in Examples 1 to 11) was determined to be 10 MPa, and the tensile modulus of elasticity of the single-layered resin film of Comparative Example 2 (corresponding to the second resin layer in Examples 1 to 10) was determined to be 3300 MPa. In this connection, each of the composition for forming a first thermoplastic resin layer in Examples 12 to 14 and the resin for forming a second thermoplastic resin layer in Example 14 was extruded into a single-layered sheet-like shape using an extruder to prepare a single-layered resin film with an average thickness of 380 μm, after which the single-layered resin film obtained was used to be measured for the tensile modulus of elasticity of each of the first thermoplastic resin layer in Examples 12 to 14 and the second thermoplastic resin layer in Example 14 in the same measurement procedure.

(4) Tensile Breaking Elongation

A sharp razor blade was used to prepare a test specimen which was sampled so as to have a strip shape of 10 mm in width by 150 mm in length. This test specimen was measured for the tensile breaking elongation at 23° C. by a method in accordance with ASTM D882: 2012 using a universal testing machine RTC-1310A available from ORIENTEC CORPORATION. The tensile breaking elongation of the single-layered resin film of Comparative Example 1 was determined to be 380%, and the tensile breaking elongation of the single-layered resin film of Comparative Example 2 was determined to be 6%. In this connection, each of the composition for forming a first thermoplastic resin layer in Examples 12 to 14 and the resin for forming a second thermoplastic resin layer in Example 14 was extruded into a single-layered sheet-like shape using an extruder to prepare a single-layered resin film with an average thickness of 380 μm, after which the single-layered resin film obtained was subjected to the same measurement procedure to be measured for the tensile breaking elongation of each of the first thermoplastic resin layer in Examples 12 to 14 and the second thermoplastic resin layer in Example 14.

(5) Tear Absorption Energy

In a tear test, the energy required for a test specimen to be torn apart, namely, the energy absorbed into a test specimen by the deformation thereof until the test specimen is torn apart is defined as the tear absorption energy. A test specimen having a test specimen-shape in accordance with JIS K7128-3:1998 was prepared using a super dumbbell cutter available from DUMBBELL CO., LTD. The area of the lower side region of a curve in the load-elongation chart obtained in the tear test by a method in accordance with JIS K7128-3:1998 using a universal testing machine RTC-1310A available from ORIENTEC CORPORATION was determined to measure the tear absorption energy. At this time, the thickness of the test specimen was determined to be 380 μm.

(6) Refractive Index

A sharp razor blade was used to prepare a test specimen which was sampled so as to have a shape of 10 mm in width by 30 mm in length. The refractive index was measured in accordance with JIS K7142 using an Abbe refractometer ER-7MW available from ERMA INC. At this time, a refractive index nD measured at 23° C. using the D line (with a wavelength of 589.3 nm) was defined as the refractive index. As a result of the measurement, the refractive index of the first thermoplastic resin layer of Comparative Example 1 was determined to be 1.481, the refractive index of the second thermoplastic resin layer of Comparative Example 2 was determined to be 1.496, and the absolute value of the difference in refractive index between the two was determined to be 0.015.

In this connection, each of the composition for forming a first thermoplastic resin layer in Examples 12 to 14 and the resin for forming a second thermoplastic resin layer in Example 14 was extruded into a single-layered sheet-like shape using an extruder to prepare a single-layered resin film with an average thickness of 380 μm, after which the single-layered resin film obtained was used to be measured for the refractive index of each of the first thermoplastic resin layer in Examples 12 to 14 and the second thermoplastic resin layer in Example 14 in the same measurement procedure. The refractive index of the first thermoplastic resin layer in Example 12 was determined to be 1.478, and the absolute value of the difference in refractive index between the first thermoplastic resin layer and the second thermoplastic resin layer was determined to be 0.018. The refractive index of the first thermoplastic resin layer in Example 13 was determined to be 1.474, and the absolute value of the difference in refractive index between the first thermoplastic resin layer and the second thermoplastic resin layer in Example 13 was determined to be 0.022. The refractive index of the first thermoplastic resin layer in Example 14 was determined to be 1.478, the refractive index of the second thermoplastic resin layer in Example 14 was determined to be 1.506, and the absolute value of the difference in refractive index between the first thermoplastic resin layer and the second thermoplastic resin layer in Example 14 was determined to be 0.028.

(7) Internal Haze

For the purpose of eliminating the light scattering caused by the unevenness on the film surface, a sample in a state of being immersed in liquid paraffin and the like was measured for the internal haze. Only the light scattering inside the sample was extracted.

A sharp razor blade was used to prepare a test specimen which was sampled so as to have a shape of 50 mm in width×50 cm in length. The test specimen in a state of being placed in a glass container containing liquid paraffin available from Wako Pure Chemical Industries, Ltd. was measured for the internal haze by a method in accordance with JIS K7105 using a haze meter TC-H3PP type available from Tokyo Denshoku Co., Ltd.

Tables 1 to 3 show the evaluation results. In the following Table 1, "PVB" refers to a polyvinyl butyral resin and "PMMA" refers to a polymethyl methacrylate resin.

TABLE 1

| | | First layer | | | Second layer | Total | | Second layer | Tear |
| | Kind of resin | Content of resin Parts by mass | Kind of plasticizer | Content of plasticizer Parts by mass | Kind of resin | number of laminations | Ratio (T1/T2) | Thickness of one layer μm | absorption energy J/mm$^2$ |
| --- | --- | --- | --- | --- | --- | --- | --- | --- | --- |
| Ex. 1 | PVB | 100 | 3GO | 40 | PMMA | 164 | 6.0 | 0.66 | 2.43 |
| Ex. 2 | PVB | 100 | 3GO | 40 | PMMA | 164 | 2.0 | 1.55 | 0.91 |
| Ex. 3 | PVB | 100 | 3GO | 40 | PMMA | 164 | 4.0 | 0.921 | 2.12 |
| Ex. 4 | PVB | 100 | 3GO | 40 | PMMA | 164 | 8.9 | 0.47 | 2.03 |
| Ex. 5 | PVB | 100 | 3GO | 40 | PMMA | 41 | 6.2 | 2.65 | 1.5 |
| Ex. 6 | PVB | 100 | 3GO | 40 | PMMA | 82 | 6.0 | 1.33 | 1.79 |

TABLE 1-continued

|  | First layer Kind of resin | First layer Content of resin Parts by mass | First layer Kind of plasticizer | First layer Content of plasticizer Parts by mass | Second layer Kind of resin | Total number of laminations | Ratio (T1/T2) | Second layer Thickness of one layer μm | Tear absorption energy J/mm² |
|---|---|---|---|---|---|---|---|---|---|
| Ex. 7 | PVB | 100 | 3GO | 40 | PMMA | 656 | 5.9 | 0.169 | 2.61 |
| Ex. 8 | PVB | 100 | 3GO | 40 | PMMA | 1312 | 6.0 | 0.083 | 2.65 |
| Ex. 9 | PVB | 100 | 3GO | 40 | PMMA | 5248 | 5.9 | 0.021 | 2.7 |
| Ex. 10 | PVB | 100 | 3GO | 40 | PMMA | 11 | 6.7 | 9.88 | 1.21 |
| Ex. 11 | PVB | 100 | 3GO | 40 | PMMA | 11 | 4.0 | 16.3 | 0.98 |
| Ex. 12 | PVB | 100 | 3GO | 35 | PMMA | 640 | 6.0 | 0.17 | 3.89 |
| Ex. 13 | PVB | 100 | 3GO | 30 | PMMA | 640 | 6.0 | 0.17 | 3.35 |
| Ex. 14 | PVB | 100 | 3GO | 35 | Hi-Milan 1706 | 160 | 6.0 | 0.68 | 1.09 |
| Comp. Ex. 1 | PVB | 100 | 3GO | 40 | — | 1 | — | — | 0.6 |
| Comp. Ex. 2 | — | — | — | — | PMMA | 1 | — | 380 | 0.02 |
| Comp. Ex. 3 | PVB | 100 | 3GO | 40 | PMMA | 3 | 2.0 | 128 | 0.23 |
| Comp. Ex. 4 | PVB | 100 | 3GO | 40 | PMMA | 3 | 3.9 | 77.1 | 0.26 |
| Comp. Ex. 5 | PVB | 100 | 3GO | 40 | PMMA | 3 | 5.9 | 55.2 | 0.41 |
| Comp. Ex. 6 | PVB | 100 | 3GO | 40 | — | 11 | — | — | 0.63 |
| Comp. Ex. 7 | — | — | — | — | PMMA | 11 | — | 34.5 | 0.03 |
| Comp. Ex. 8 | PVB | 100 | 3GO | 40 | PMMA | 11 | 1.0 | 34.5 | 0.06 |
| Comp. Ex. 9 | PVB | 100 | 3GO | 40 | PMMA | 164 | 1.0 | 2.32 | 0.08 |

TABLE 2

|  | First layer Kind of resin | First layer Content of resin Parts by mass | First layer Kind of plasticizer | First layer Content of plasticizer Parts by mass | Second layer Kind of resin | Total number of laminations | Ratio (T1/T2) | Internal haze % |
|---|---|---|---|---|---|---|---|---|
| Ex. 1 | PVB | 100 | 3GO | 40 | PMMA | 164 | 6 | 0.4 |
| Ex. 2 | PVB | 100 | 3GO | 40 | PMMA | 164 | 2 | 0.3 |
| Ex. 3 | PVB | 100 | 3GO | 40 | PMMA | 164 | 4 | 0.4 |

TABLE 3

|  | Tensile modulus of elasticity (MPa) First layer | Tensile modulus of elasticity (MPa) Second layer | Tensile breaking elongation (%) First layer | Tensile breaking elongation (%) Second layer | Refractive index First layer | Refractive index Second layer |
|---|---|---|---|---|---|---|
| Ex. 1-11 | 10 | 1300 | 380 | 6 | 1.481 | 1.496 |
| Ex. 12 | 13 | 1300 | 305 | 6 | 1.478 | 1.496 |
| Ex. 13 | 24 | 1300 | 278 | 6 | 1.474 | 1.496 |
| Ex. 14 | 13 | 402 | 305 | 306 | 1.478 | 1.506 |
| Comp. Ex. 1 | 10 | — | 380 | — | 1.481 | — |
| Comp. Ex. 2 | — | 1300 | — | 6 | — | 1.496 |
| Comp. Ex. 3-5 | 10 | 1300 | 380 | 6 | 1.481 | 1.496 |
| Comp. Ex. 6 | 10 | — | 380 | — | 1.481 | — |
| Comp. Ex. 7 | — | 1300 | — | 6 | 1.481 | 1.496 |
| Comp. Ex. 8-9 | 10 | 1300 | 380 | 6 | 1.481 | 1.496 |

EXPLANATION OF SYMBOLS

1: Resin film
1a: First surface
1b: Second surface
11: Thermoplastic resin layers
11A: First thermoplastic resin layer
11B: Second thermoplastic resin layer
21: Laminate (41 layers)
22: Laminate (82 layers)
51: Laminated glass
52: First laminated glass member
53: Second laminated glass member

The invention claimed is:

1. A thermoplastic resin film, comprising a plurality of first thermoplastic resin layers each containing a thermoplastic resin and a plurality of second thermoplastic resin layers each containing a thermoplastic resin, and having a multilayer structure in which the first thermoplastic resin layers and the second thermoplastic resin layers are laminated in a thickness direction,
  a number of laminations in total of the first thermoplastic resin layers and the second thermoplastic resin layers in the thickness direction being greater than or equal to 5,
  a ratio of a total thickness of the first thermoplastic resin layers to a total thickness of the second thermoplastic resin layers being greater than or equal to 4,
  a tensile modulus of elasticity of the respective first thermoplastic resin layers being less than or equal to 30 MPa, and
  a tensile modulus of elasticity of the respective second thermoplastic resin layers being greater than or equal to 280 MPa.

2. The thermoplastic resin film according to claim 1, wherein a tensile breaking elongation of the respective first thermoplastic resin layers is greater than or equal to 200%, and a tensile breaking elongation of the respective second thermoplastic resin layers is less than or equal to 15%.

3. The thermoplastic resin film according to claim 1, wherein the thermoplastic resin contained in the first thermoplastic resin layer is a polyvinyl acetal resin.

4. The thermoplastic resin film according to claim 1, wherein the thermoplastic resin contained in the second thermoplastic resin layer is a thermoplastic resin different from a polyvinyl acetal resin.

5. The thermoplastic resin film according to claim 1, wherein an absolute value of a difference in refractive index between the first thermoplastic resin layer and the second thermoplastic resin layer is less than 0.03.

6. The thermoplastic resin film according to claim 1, wherein the number of laminations in total of the first thermoplastic resin layers and the second thermoplastic resin layers in the thickness direction is greater than or equal to 10.

7. The thermoplastic resin film according to claim 1, wherein the number of laminations in total of the first thermoplastic resin layers and the second thermoplastic resin layers in the thickness direction is greater than or equal to 160.

8. The thermoplastic resin film according to claim 1, wherein a thickness of the respective second thermoplastic resin layers is less than or equal to 11 μm.

9. The thermoplastic resin film according to claim 1, wherein the thermoplastic resin contained in the first thermoplastic resin layer is a polyvinyl acetal resin, and the number of laminations in total of the first thermoplastic resin layers and the second thermoplastic resin layers in the thickness direction is greater than or equal to 10.

10. The thermoplastic resin film according to claim 1, wherein at least one of the thermoplastic resin contained in the first thermoplastic resin layer and the thermoplastic resin contained in the second thermoplastic resin layer is selected from the group consisting of an AS resin, an ABS resin, an MS resin, an MBS resin, and an SB resin.

11. The thermoplastic resin film according to claim 1, wherein at least one of the thermoplastic resin contained in the first thermoplastic resin layer and the thermoplastic resin contained in the second thermoplastic resin layer is a polyimide resin.

12. The thermoplastic resin film according to claim 1, wherein at least one of the thermoplastic resin contained in the first thermoplastic resin layer and the thermoplastic resin contained in the second thermoplastic resin layer is a cellulose acetate resin.

13. The thermoplastic resin film according to claim 1, wherein the thermoplastic resin film comprises a stack of A/B/A/A/B/A or a stack of A/B/B/A/B/B where A represents the first thermoplastic resin layer and B represents the second thermoplastic resin layer.

14. The thermoplastic resin film according to claim 1, is used for obtaining laminated glass and is an interlayer film for laminated glass.

15. Laminated glass, comprising
  a first laminated glass member,
  a second laminated glass member, and
  an interlayer film for laminated glass which is the thermoplastic resin film according to claim 14,
  the interlayer film for laminated glass being arranged between the first laminated glass member and the second laminated glass member.

* * * * *